(No Model.)
E. J. WELLS.
BRAKE FOR BABY CARRIAGES.
No. 494,910. Patented Apr. 4, 1893.
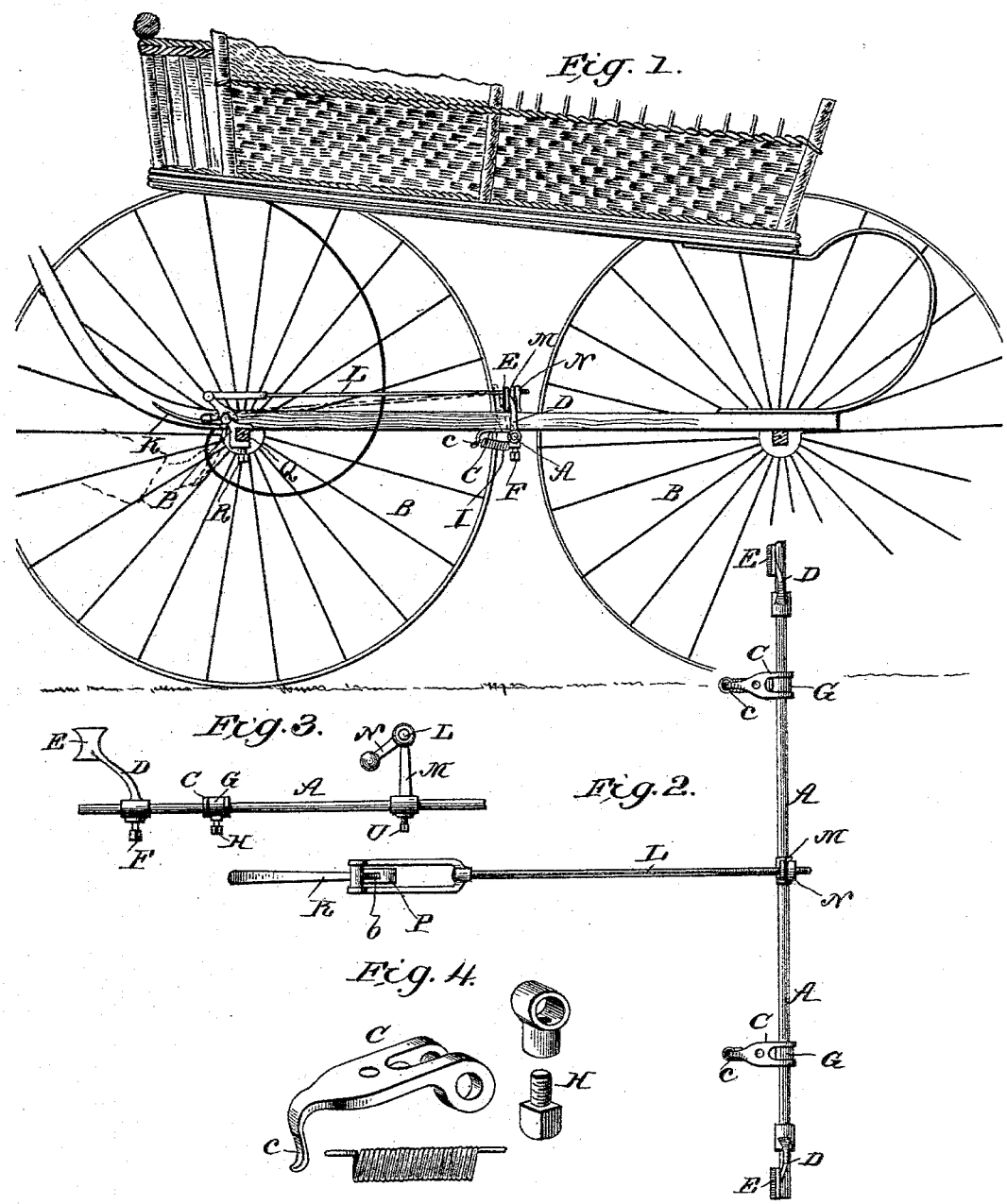
WITNESSES:
Fred G. Dieterich
Anna W. Hart
INVENTOR
Elmer J. Wells
BY Munn
ATTORNEYS.

UNITED STATES PATENT OFFICE.

ELMER J. WELLS, OF NASHUA, IOWA.

BRAKE FOR BABY-CARRIAGES.

SPECIFICATION forming part of Letters Patent No. 494,910, dated April 4, 1893.

Application filed July 1, 1892. Serial No. 438,713. (No model.)

*To all whom it may concern:*

Be it known that I, ELMER J. WELLS, of Nashua, in the county of Chickasaw and State of Iowa, have invented an Improved Brake for Children's Carriages; and I do hereby declare that the following is a full, clear, and exact description of the same.

The invention relates generally to improvements in carriage brakes, but is particularly adapted for use on children's or baby carriages, perambulators and the like. The brake is so constructed that it may be adjusted for use on carriages of different sizes, and the brake shoes may be arranged to act on either the front or rear wheels, as required or preferred. The brake is operated by a setting lever which is arranged at the rear of the carriage and forms the main part of a toggle joint that serves to lock the wheels so that the carriage may be prevented from moving, whenever desired, until the brake is released by the tripping of the lever.

In the accompanying drawings—Figure 1 is a side view of a child's carriage provided with my brake. Fig. 2 is a plan view of the brake attachment. Fig. 3 is a side view of a portion of the brake bar and its attachments. Fig. 4 is a perspective view of brake bar hanger and connections detached from each other.

The brake-beam or bar, A, is supported in position, transversely, between the front and rear wheels B, B, of a baby, or child's carriage by means of hangers C, C, which are secured by screws, or other preferred means, to the under side of the carriage reaches, or other portion of the frame. The arms D, D, that carry the brake-shoes, E, are provided wih a hub, and clamped on the brake-bar, A, by means of screws, F. By this construction and combination of parts, the said arms, D, may not only be adjusted along the brake-bar, A, to bring the shoes, E, opposite the rims of the wheels B, but the arms may likewise be turned down, to adapt them to act on the front wheels instead of the rear ones, as arranged in this instance. The front ends of the hangers are bifurcated, to adapt them to receive the collar, G, between them. The said collar is adjustable on the brake-bar A, and being clamped on the same by a screw H, it serves to prevent longitudinal movement of the brake-bar. The same screw (H) also serves as a point of attachment of the coiled springs I, whose rear end is attached to a pendent extension, or finger, c, of the adjacent hanger. The tension of the springs I, serves to hold the brake arms, D, normally thrown back, so that the shoes E are kept out of contact with the wheels, B, save when the brake lever K, and pull-rod L, are operated. The connection between such rod, L, and the brake-bar, A, is an adjustable one. The rod passes through the eye in the outer and upper end of a lever arm, M, and is screw-threaded to adapt it for application of a tail nut N. The inner and lower end of the said lever arm is provided with a hub that fits the brake-bar, and is secured adjustably thereon by means of a clamping screw U. By these means, the length of the pull-rod, L, may be practically adjusted as required to regulate the pressure of the brake shoes or to adapt the braking mechanism for carriages which have wheels of different sizes, or whose bodies or frames differ in length. This adaptation for lengthwise adjustment, coupled with the adjustability of the brake arms, D, and hangers, C, and collars, G, on the brake-bar A—as before described—enable my improved brake mechanism to be applied to various sizes and styles of carriages.

The elbow setting lever K, is pivoted at its angle to a clip, P, which is clamped on the rear axle, Q, by means of a screw, R, as shown in Fig. 1, while its shorter arm is pivoted to the bifurcated extremity of the pull-rod, L. This construction and arrangement form a a toggle joint, and also a brake lock, as will be apparent from the following statement of the operation.

As before stated, the coiled springs, I, hold the shoes, E, normally out of contact with the carriage wheels, B, and they also cause the lever arm, M, to apply tension to the rod L, so that the longer arm of the setting lever, K, is held extended horizontally as shown by full lines Fig. 1. But when it is desired to apply the brake for locking the wheels immovably, the longer arm of the lever K, is depressed by applying the foot—as shown by dotted lines—whereby the lever, K, assumes the position shown by dotted lines, and exerts tension on the rod, L, thus applying the brake-shoes to the wheels and also locking them in such position. The "lock" is effected by the rear end of the pull-rod being drawn down below the fulcrum of the setting lever, as shown. To release the "lock," the lever is tripped by throwing its longer arm upward, when the coiled springs I restore the parts to the original position shown by full lines Fig. 1.

It will be seen, that the adaptation of the clip, P, for adjustment along the rear axle has relation to the like adjustability of the lever arm, M, on the brake-bar, A, in that both such arm and the setting lever K, may be adjusted laterally together, as required to apply the brake mechanism to carriages having a spring on each side or in the center. It will be further noted, that the lever is provided at the apex of its angle, with a shoulder, b, which comes in contact with a clip, P, when the brake mechanism is in the normal position, and thus serves as a stop which prevents the tension of the springs I from throwing up the long arm of the lever into such position that the foot could not be conveniently applied to it.

What I claim is—

1. The combination with the brake-bar of bifurcated hangers which are adjustable thereon and adapted to be secured to the reaches of a carriage, a collar adapted for adjustment on the brake-bar, and arranged between the arms of said hangers, and screws for clamping the collars in any adjustment, as shown and described.

2. The combination with the brake-bar, having lever arms carrying brake-shoes, and hangers arranged as specified, of springs attached to said hangers at one end and at the other end to a projection fixed on the brake-bar, as shown and described.

3. The combination, with the rocking brake-bar having shoe-carrying arms, and the pull-rod connected with the brake-bar, of the elbow setting lever pivoted at the extremity of its shorter arm to the rear end of the pull-rod and fulcrumed at its angle on a clip secured to the axle, all arranged as shown and described whereby the said lever may act as a toggle joint to "lock" the brake shoes to the wheels as specified.

4. The combination of the setting lever and the pull-rod with the clip and lever arm M, said clip and lever arm being clamped adjustably on the rear carriage axle and brake-bar, respectively as shown and described for the purpose specified.

ELMER J. WELLS.

Witnesses:
GIDEON B. WOOD,
HENRY A. BARTSCH.